United States Patent
Kim et al.

(10) Patent No.: US 8,271,552 B2
(45) Date of Patent: *Sep. 18, 2012

(54) METHOD AND APPARATUS FOR ENCODING/DECODING

(75) Inventors: Tae Hyeon Kim, Seoul (KR); Hyouk Jean Cha, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 588 days.

This patent is subject to a terminal disclaimer.

(21) Appl. No.: 12/083,381

(22) PCT Filed: Oct. 13, 2006

(86) PCT No.: PCT/KR2006/004120
§ 371 (c)(1),
(2), (4) Date: Sep. 18, 2008

(87) PCT Pub. No.: WO2007/043824
PCT Pub. Date: Apr. 19, 2007

(65) Prior Publication Data
US 2009/0154497 A1    Jun. 18, 2009

Related U.S. Application Data (60) Provisional application No. 60/725,655, filed on Oct. 13, 2005, provisional application No. 60/725,652, filed on Oct. 13, 2005, provisional application No. 60/726,230, filed on Oct. 14, 2005, provisional application No. 60/757,463, filed on Jan. 10, 2006, provisional application No. 60/787,173, filed on Mar. 30, 2006, provisional application No. 60/788,736, filed on Apr. 4, 2006, provisional application No. 60/789,876, filed on Apr. 7, 2006.

(51) Int. Cl.
*G06F 12/00* (2006.01)
*G06F 17/30* (2006.01)

(52) U.S. Cl. ........ 707/821; 707/913; 707/915; 707/916; 707/955

(58) Field of Classification Search .................. 707/736, 707/802, 913, 915, 821, 916, 955
See application file for complete search history.

(56) References Cited

U.S. PATENT DOCUMENTS
5,715,356 A * 2/1998 Hirayama et al. ............ 386/239
(Continued)

FOREIGN PATENT DOCUMENTS
EP    1018840    7/2000
(Continued)

OTHER PUBLICATIONS

Taiwanese Office Action dated Nov. 27, 2009 for corresponding Application No. 095137765.

(Continued)

*Primary Examiner* — Phong Nguyen
(74) *Attorney, Agent, or Firm* — Harness, Dickey & Pierce, P.L.C.

(57) ABSTRACT

The present invention relates to a multimedia data encoding/decoding method and apparatus. The encoding method includes generating a data area comprising a plurality of media data areas; generating a plurality of track areas corresponding to the plurality of media data areas, respectively; and generating a meta area comprising a first area comprising identification information on media data and a second area comprising position information on the media data. According to the present invention, the multimedia data encoding/decoding method and apparatus has an effect of being capable of constructing a slide show by only a small amount of multimedia data. Thus, a time taken to process and transmit the multimedia data can reduce.

10 Claims, 5 Drawing Sheets

U.S. PATENT DOCUMENTS

| | | | |
|---|---|---|---|
| 5,831,627 A | 11/1998 | Cohen | |
| 5,835,671 A * | 11/1998 | Kitamura et al. | 386/243 |
| 5,928,330 A | 7/1999 | Goetz et al. | |
| 6,037,983 A | 3/2000 | Au et al. | |
| 6,369,835 B1 | 4/2002 | Lin | |
| 6,396,500 B1 * | 5/2002 | Qureshi et al. | 345/473 |
| 6,674,918 B1 | 1/2004 | Liu et al. | |
| 6,914,616 B2 | 7/2005 | Otera | |
| 6,957,388 B1 * | 10/2005 | Taguchi et al. | 715/723 |
| 6,957,389 B2 | 10/2005 | Faraday et al. | |
| 6,979,769 B1 * | 12/2005 | Majima et al. | 84/645 |
| 7,286,746 B1 * | 10/2007 | Ando et al. | 386/278 |
| 7,536,081 B2 | 5/2009 | Ando et al. | |
| 2001/0054074 A1 * | 12/2001 | Hayashi | 709/206 |
| 2002/0057386 A1 | 5/2002 | Otera | |
| 2002/0107737 A1 | 8/2002 | Kaneko et al. | |
| 2002/0133520 A1 | 9/2002 | Tanner | |
| 2002/0147740 A1 | 10/2002 | Faraday et al. | |
| 2002/0191698 A1 | 12/2002 | Lee et al. | |
| 2003/0051113 A1 | 3/2003 | Beardsley et al. | |
| 2003/0142126 A1 | 7/2003 | Estrada et al. | |
| 2003/0161425 A1 * | 8/2003 | Kikuchi | 375/354 |
| 2003/0188312 A1 * | 10/2003 | Bae et al. | 725/55 |
| 2004/0054542 A1 | 3/2004 | Foote et al. | |
| 2004/0109677 A1 | 6/2004 | Seo et al. | |
| 2004/0110490 A1 | 6/2004 | Steele et al. | |
| 2004/0151473 A1 * | 8/2004 | Itoh | 386/83 |
| 2004/0220926 A1 | 11/2004 | Lamkin et al. | |
| 2005/0017986 A1 | 1/2005 | Anwar et al. | |
| 2005/0018615 A1 * | 1/2005 | Itoh et al. | 370/252 |
| 2005/0086582 A1 | 4/2005 | Frojdh et al. | |
| 2005/0097471 A1 | 5/2005 | Faraday et al. | |
| 2005/0201718 A1 | 9/2005 | Kato | |
| 2005/0207442 A1 | 9/2005 | Zoest et al. | |
| 2006/0095461 A1 | 5/2006 | Raymond | |
| 2006/0129909 A1 | 6/2006 | Butt et al. | |
| 2006/0245805 A1 | 11/2006 | Takakuwa et al. | |
| 2006/0251398 A1 * | 11/2006 | Ando et al. | 386/95 |

FOREIGN PATENT DOCUMENTS

| | | |
|---|---|---|
| EP | 1302900 | 4/2003 |
| EP | 1357749 | 10/2003 |
| EP | 1376406 | 1/2004 |
| EP | 1414042 | 4/2004 |
| EP | 1577795 | 9/2005 |
| EP | 1583099 | 10/2005 |
| JP | 07-074955 | 3/1995 |
| JP | 08-190488 | 7/1996 |
| JP | 2000-194843 | 7/2000 |
| JP | 2001-142741 | 5/2001 |
| JP | 2002-008052 | 1/2002 |
| JP | 2003-264598 | 9/2003 |
| KR | 10-2004-0102138 | 12/2004 |
| TW | 233552 | 6/2005 |
| WO | WO 94/23361 | 10/1994 |
| WO | WO 98/37699 | 8/1998 |
| WO | WO 99/37072 | 7/1999 |
| WO | WO 99/64944 | 12/1999 |
| WO | WO 01/95632 | 12/2001 |

OTHER PUBLICATIONS

Taiwanese Office Action dated Dec. 22, 2009 for corresponding Application No. 095137769.
Taiwanese Office Action dated Dec. 24, 2009 for corresponding Application No. 095137766.
Chinese Office Action dated Jan. 8, 2010 for corresponding Application No. 200680043387.2.
Taiwanese Office Action dated Feb. 8, 2010 for corresponding Taiwanese Patent Application No. 095137772.
Apple Inc. "QuickTime Vr" Internet Citation Jun. 4, 2005, XP002458434 retrieved from the Internet: URL:http//developer.apple.com/documentation/QuickTime/InsideQT_QTVR/insideqt_qtvr.pdf.
Apple Computer, Inc.: "QuickTime File Format" Mar. 1, 2001, XP002588828 Retrieved from the Internet: URL:http://developer.apple.com/standars/gtff-2001.pdf.
Gerhard A. Schloss, Michael J. Wynblatt: "Providing definition and temporal structure for multimedia data" Multimedia Systems, vol. 3, No. 5-6, Nov. 30, 1995.
Takahiro Fukuhara, David Singer: "Motion JPEG2000 Final Committee Draft 1.0" Audio-Video, Mar. 14, 2001, XP040396370.
European Search Report dated Jul. 16, 2010 for corresponding European Patent Application No. 06799209.9.
U.S: Office Action dated Jul. 30, 2010 in corresponding U.S. Appl. No. 12/083,339.
European Search Report dated Jul. 16, 2010 in corresponding European Application No. 06799209.9.
Apple Inc: "QuickTime VR", Internet Citation XP002458434, pp. 18-19, Figs. 1-2, (Jun. 4, 2005).
Apple Inc: "QuickTime VR", Internet Citation XP002588828, pp. 31-33, 49-63, 71-73, 92-103 and 229-230; Figs. 10-12 and 17-21, (Jun. 21, 2010).
Schloss et al., "Providing definition and temporal structure for multimedia data", Multimedia Systems, vol. 3, No. 5-6, pp. 264-277 (Nov. 30, 1995).
Fukui-Iara et al., "Motion JPEG2000 Final Committee Draft 1.0", Audio-Video, pp. 6-7, 10-18 and 28-30 (Mar. 14, 2001).
Korean Office Action dated Oct. 14, 2009.
U.S. Office Action dated May 23, 2011 issued in corresponding U.S. Appl. No. 12/083,340.
European Office Action dated Apr. 7, 2011 issued in corresponding European Application No. 06799209.9.
"International Standard ISO/IEC 14496-12 Information technology Coding of audio-visual objects Part 12: ISO base media file format," Second Edition, Corrected version Oct. 1, 2005, pp. 1-84, XP007914375, Retrieved from the Internet: URL—http://www.iso.org/iso/iso_catalogue/catalogue_ics/catalogue_detail_ics.htm?csnumber=41828 (retrieved on Aug. 11, 2010).
U.S. Office Action dated May 13, 2011 issued in corresponding U.S. Appl. No. 12/083,339.
U.S. Office Action dated Aug. 4, 2011 issued in corresponding U.S. Appl. No. 12/083,355.
U.S. Office Action dated Sep. 14, 2011 issued in corresponding U.S. Appl. No. 12/083,341.
European Search Report dated Sep. 6, 2011 issued in corresponding European Application No. 06799198.4.
European Search Report dated Sep. 6, 2011 issued in corresponding European Application No. 06799199.2.
European Search Report dated Sep. 6, 2011 issued in corresponding European Application No. 06799204.0.
Singer, D. et al. "ISO/IEC 14496-1/PDAM1 Use of AVC in MPEG-4 Systems and the MP4 File Format," International Standard ISO/IEC, XX, XX, Jul. 26, 2002, pp. I-VI, 01, XP001074666.
European Search Report dated Oct. 13, 2011 issued in corresponding European Application No. 06799200.8.
European Search Report dated Oct. 14, 2011 issued in corresponding European Application No. 06799203.2.
European Search Report dated Oct. 13, 2011 issued in corresponding European Application No. 06799206.5.
Villard et al., "*An XML-based Multimedia Document Processing Model for Content Adaptation*," 2004, pp. 1-12.
Office Action for corresponding U.S. Appl. No. 12/083,340 dated Jan. 17, 2012.
Office Action for corresponding U.S. Appl. No. 12/083,380 dated Jan. 27, 2012.
U.S. Office Action dated Jan. 27, 2012, issued in corresponding U.S. Appl. No. 12/083,339.

* cited by examiner

METHOD AND APPARATUS FOR ENCODING/DECODING

This application is a National Phase entry of PCT Application No. PCT/KR2006/004120, filed on Oct. 13, 2006, which claims priority under 35 U.S.C. §119(e), 120 and 365 (c) to U.S. Provisional Application No. 60/725,655, filed on Oct. 13, 2005, U.S. Provisional Application No. 60/725,652, filed on Oct. 13, 2005, U.S. Provisional Application No. 60/726,230, filed on Oct. 14, 2005, U.S. Provisional Application No. 60/757,463, filed on Jan. 10, 2006, U.S. Provisional Application No. 60/787,173, filed on Mar. 30, 2006, U.S. Provisional Application No. 60/788,736, filed on Apr. 4, 2006, and U.S. Provisional Application No. 60/789,876, filed on Apr. 7, 2006, in the U.S. Patent and Trademark Office, the contents of each of which are incorporated by reference in its entirety.

BACKGROUND OF THE INVENTION

1. Field of the Invention

The present invention relates to a method and apparatus for encoding/decoding multimedia data including a video, an audio, and a text, and more particularly, to an encoding/decoding method and apparatus for sequentially reproducing a plurality of media data, thereby constructing a slide show.

2. Description of Related Art

There occurs a drawback in that a time required for encoding/decoding and a time required for data transmission increase because of a very large amount of data in a multimedia data processing method for integrating and encoding/decoding various formats of media data such as a video, an audio, and a text.

SUMMARY OF THE INVENTION

Accordingly, the present invention is to solve at least the problems and disadvantages of the background art.

The present invention is to provide a multimedia data structure for efficiently encoding/decoding multimedia data, and a multimedia data encoding/decoding method and apparatus using the same.

To achieve these and other advantages and in accordance with the purpose of the present invention, as embodied and broadly described, there is provided an encoding method. The encoding method includes generating a data area including a plurality of media data areas; generating a plurality of track areas corresponding to the plurality of media data areas, respectively; and generating a meta area including a first area including identification information on media data and a second area including position information on the media data. The track area includes timing information for sequentially reproducing a plurality of media data included in the media data area, and the plurality of media data included in the data area are dependent on one timeline.

In another aspect, there is provided a decoding method. The decoding method includes receiving multimedia data including: a data area including a plurality of media data areas; a plurality of track areas corresponding to the plurality of media data areas, respectively; and a meta area including a first area including identification information on the media data and a second area including position information on the media data; and sequentially reproducing a plurality of media data included in the media data area, using timing information included in the track area. The plurality of media data included in the data area are dependent on one timeline.

In a further another aspect, there is provided an encoding apparatus. The encoding apparatus includes a data area generator for generating a data area including a plurality of media data areas; a track area generator for generating a plurality of track areas corresponding to the plurality of media data areas, respectively; and a meta area generator for generating a meta area including a first area including identification information on media data and a second area including position information on the media data. The track area includes timing information for sequentially reproducing a plurality of media data included in the media data area, and the plurality of media data included in the data area are dependent on one timeline.

In a yet another aspect, there is provided a decoding apparatus. The decoding apparatus includes a data input unit for receiving multimedia data including: a data area including a plurality of media data areas; a plurality of track areas corresponding to the plurality of media data areas, respectively; and a meta area including a first area including identification information on the media data and a second area including position information on the media data; and a reproducing unit for sequentially reproducing a plurality of media data included in the media data area, using timing information included in the track area. The plurality of media data included in the data area are dependent on one timeline.

In a still another aspect, there is provided a multimedia data structure. The structure includes a data area including a plurality of media data areas; a plurality of track areas corresponding to the plurality of media data areas, respectively; and a meta area including a first area including identification information on media data and a second area including position information on the media data. The track area includes timing information for sequentially reproducing a plurality of media data included in the media data area.

According to the present invention, a multimedia data encoding/decoding method and apparatus has an effect of being capable of constructing a slide show using only a small amount of multimedia data. Thus, a time taken to process and transmit the multimedia data may be reduced.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Figure 1:
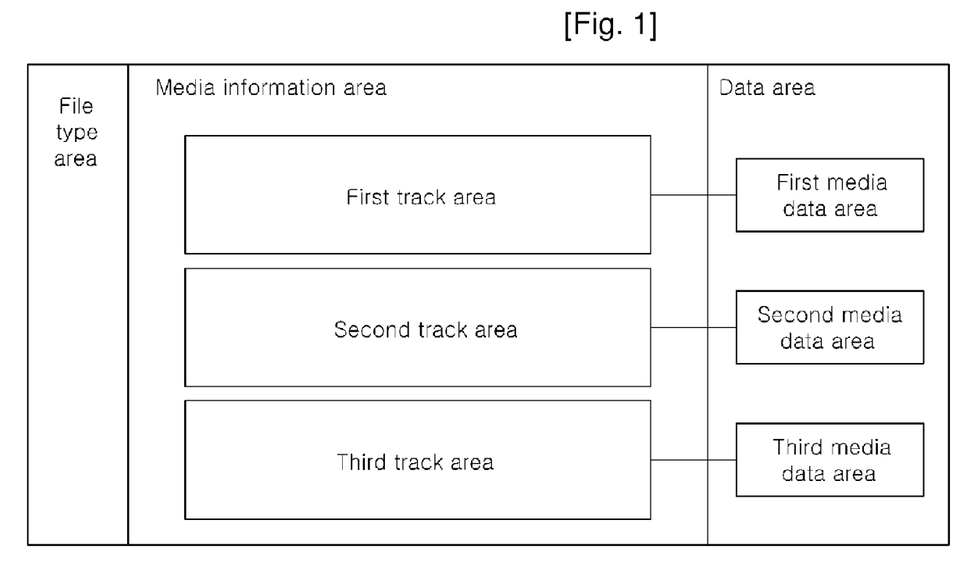
FIG. 1 is a schematic diagram illustrating an entire structure of multimedia data according to the present invention.

FIG. 1 is a schematic diagram illustrating an entire structure of multimedia data according to the present invention. As shown, a multimedia data file is comprised of a file type area, a media information area, and a data area.

The file type area represents a format of a multimedia data file, and can be expressed in a form or version of the multimedia data file. For example, it can represent that the format of the multimedia data file is an MPEG-4 version 2 format when a file type is "mp42".

The data area includes a plurality of media data areas. Each of the media data areas includes media data. FIG. 1 shows that the data area includes first, second, and third media data areas. But, the data area can also include four or more media data areas or two or less media data areas. The media data areas can include several types of media data such as image data, audio data, or text data. The image data can be still picture data or moving picture data.

The media information area has information on the media data included in the data area. Referring to FIG. 1, it is desirable that the media information area includes a plurality of track areas that correspond to the plurality of media data areas included in the data area, respectively. In detail, the media information area can include a first track area, a second track area, and a third track area. The first track area has information on the media data included in the first media data area. The second track area has information on the media data included in the second media data area. The third track area has information on the media data included in the second media data area.

The track area included in the media information area can have timing information for sequentially reproducing the media data included in the corresponding media data area, thereby constructing a slide show. For example, the first track area can have information on a duration for reproducing the media data included in the first media data area.

The track area can include several pieces of information on the media data. For example, when the media data is music data, its corresponding track area can include musician information or musical composer information.

Figure 2:
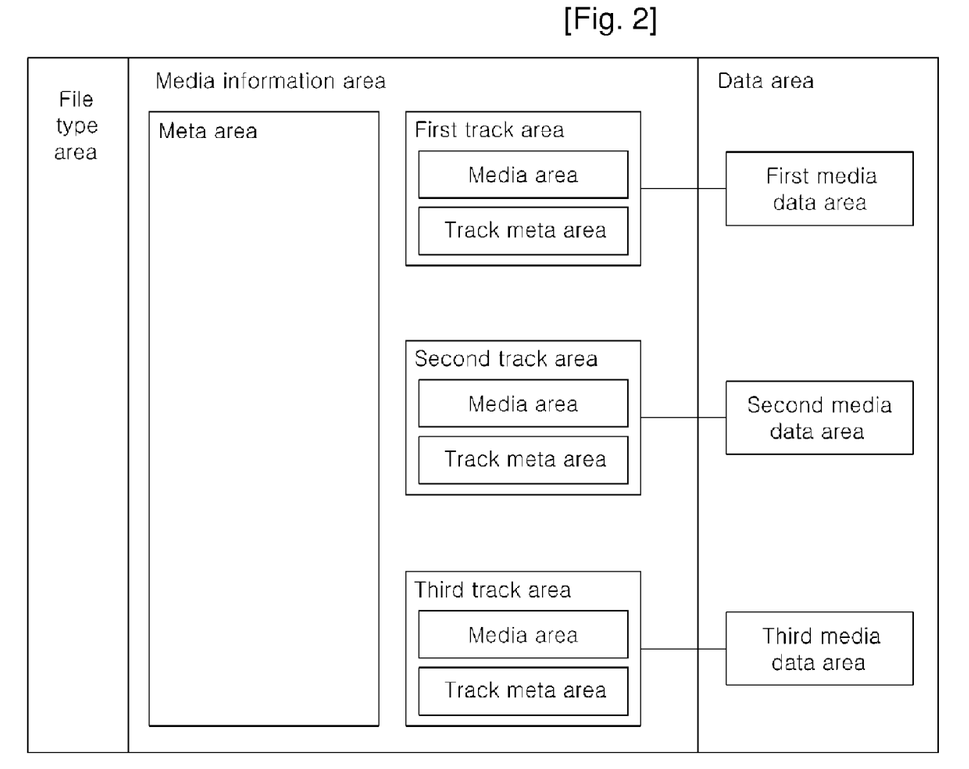
FIG. 2 illustrates a multimedia data structure according to a first exemplary embodiment of the present invention.

FIG. 2 illustrates a multimedia data structure according to a first exemplary embodiment of the present invention. Media information area can include track areas corresponding to media data areas, respectively, and a meta area. The track area can be comprised of a media area and a track meta area.

The meta area is included in the media information area at the same level as those of the track areas. The meta area includes information on the media data included in the data area. The information is information on an attribute for distinguishing the plurality of media data from each other. Desirably, the meta area includes identification (ID) information and position information on the media data. More desirably, the meta area can include name information, contents type information, ID, position information, and size information on the media data.

The following is an example of media data information included in the meta area. In this case, the first media data area includes the N number of JPEG image data, and the second media data area includes MP3 audio data, and the third media data area includes text data.

```
MP3
  item_ID = 1
  item_name = <rel. url to mp3>
  content_type = audio/mp3
JPEG 1
  item_ID = 2
  item_name = <rel. url to jpeg 1>
  content_type = image/jpeg
...
JPEG N
  item_ID = N+1
  item_name = <rel. url to jpeg N>
  content_type = image/jpeg
Text
  item_ID = N+2
  item_name = <rel. url to text>
  content_type = text
```

The meta area includes a first meta area and a second meta area. The first and second meta areas can share and include information on the media data. For example, the first meta area can include name and content type information on the media data, and the second meta area can include physical position and size information on the media data.

A handler type of the meta area can be designated to "lsr1" and used.

Figure 3:
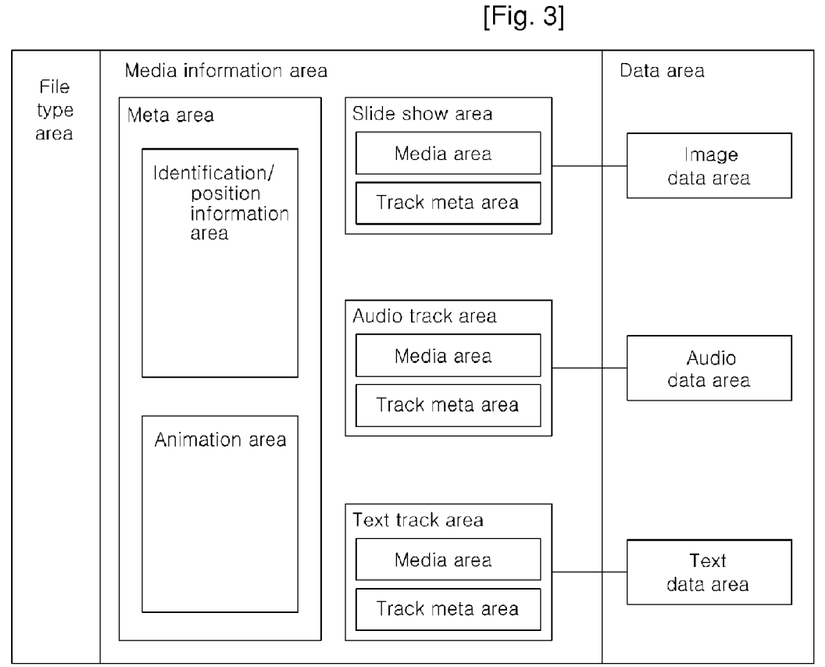
FIG. 3 illustrates a multimedia data structure according to a second exemplary embodiment of the present invention.

Referring to FIG. 3, a meta area can include an animation area having information on an animation effect to be applied to media data. The animation area can include at least one of grouping information on the animation effect, and size information, opacity effect information, and geometrical transform information on the media data to which the animation effect is applied. The grouping information represents a combination of the animation effects to be applied to the media data. The size information describes a variation of an image size when the media data is image data.

The opacity effect information describes an image fade-in or fade-out effect. The geometrical transform information describes effects of transition between images, image scale transform, rotation, and skew, and the like.

The animation area can include information on a motion path of an image or information on motion paths of objects included in the image. The animation area can include image color change information or image form information. The image form information can be a rectangle, a circle, an oval, a line, a polyline, a polygon, and the like. The animation area can include attribute control information for controlling the attribute of the media data, to realize several animation effects applicable to the media data.

Figure 4:
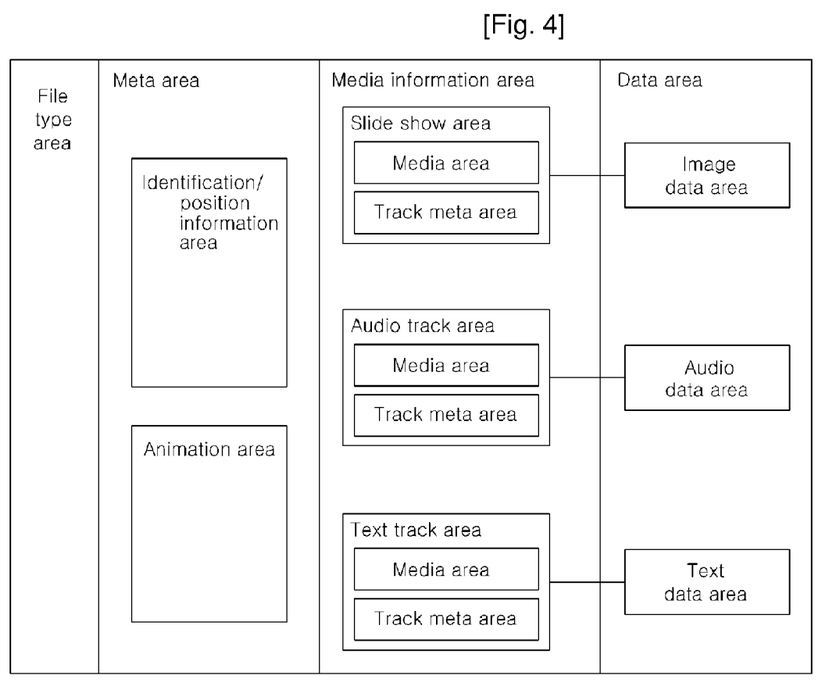
FIG. 4 illustrates a multimedia data structure according to a third exemplary embodiment of the present invention.

As shown in FIG. 4, a meta area can be positioned on a file level, not included in a media information area. In other words, a multimedia data file can be comprised of four areas: a file type area, the meta area, a media information area, and a data area.

The animation area can use a language such as Lightweight Application Scene Representation (LASeR), Scalable Vector Graphics (SVG), or BInary Format for Scene (BIFS), to describe animation effect information. The LASeR, SVG, or BIFS can be realized in an eXtensible Mark-up Language (XML) format or a Binary encoded format.

The following is an example of the animation effect information expressed using the SVG, and expresses the opacity effect information, the scale transform information, and the size variation information.

```
<svg>
  <g id="Article_Image">
    <animate attributeName="opacity" calcMode="linear"
      values="0.00;1.00;1.00;1.00;1.00;1.00;1.00"
      dur="8.0" repeatDur="indefinite"/>
    <animateTransform attributeName="transform" type="scale"
      additive="sum" calcMode="linear" values="1.00 1.00;1.00
      1.00;1.00 1.00;1.00 1.00;0.50 1.00;0.00 1.00;1.00 1.00" dur="8.0"
      repeatDur="indefinite"/>
    <image width="200" height="150" #sampleID = 1 >
    </image>
  </g>
</svg>
```

A symbol (<) signifies a start, and a symbol (>) signifies an end. A symbol (/) signifies an end of a context to be defined. For example, a context of <svg> to </svg> is a bundle, and a context of <g id="Article_image"> to </g> is a bundle, and a context of <image width="200" height="150" #sample=1> to </image> is a bundle. The "g" denotes a group and the "Article_image" represents a name of the group (g) in the <g id="Article_image">. The "opacity" and "transform" are names of animation attributes or animation effects. The "opacity" and "transform" represent opacity effect and geometrical transform, respectively. A symbol (sum) represents a sum of the animation attributes. A symbol (dur) represents information on the duration for reproducing the image data. A symbol (infinite) signifies indefiniteness.

In case that the image data is regarded as one sample, an image to be realized by the image data (#sampleID=1) having an identification number (ID) of '1' has a width of 200 and a height of 150 in size. The animation effect information expresses an animation effect of linearly (calcMode="linear") indefinitely repeating (repeatDur="indefinite") a non-opacity variation for the image data (#sampleID=1) from a full non-opacity (value=0.00) to an original non-opacity (value=1.00) during eight seconds (dur="8.0"). Also, the animation effect information expresses an animation effect of linearly (calcMode="linear") indefinitely repeating (repeatDur="indefinite") the size variation ("transform, scale") of the image data (#sampleID=1) from an original image size (value=1.00) to a half of a horizontal-direction size of an image (value=y; x=1.00; 0.50) during eight seconds (dur="8.0"). Also, the animation effect information depicts simultaneous implementation (additive="sum") of the two animation effects.

The image data comprised of one or more samples is distinguished from each other in a chunk unit. The samples can be arranged in a temporal sequence at each chunk. Each sample included in the chunk has its inherent identification number (ID). The inherent identification number (ID) of each sample can be given starting from '1'. The image data (#sampleID=1) having the inherent identification number (ID) of '1' represents, not data itself, its sample.

Referring to FIG. 2, the track area can include the media area, and the track meta area. The media area includes the timing information for sequentially reproducing the media data, thereby constructing the slide show. The track meta area includes the information on the media data.

There exists the timing information on each of the media data. Thus, the durations of reproducing the media data, respectively, cannot be consistent with each other.

The media area can include a first area having the reproduction duration information on the media data; a second area having the position information on the media data; and a third area having the size information on the media data. The media data to be reproduced can be searched using the position and size information included in the second and third areas.

The timing information on the media area can be expressed using the language such as the LASeR, the SVG, or the BIFS. The LASeR, the SVG, or the BIFS can be realized in the XML format or the Binary encoded format.

The timing information on all the media data included in the data area can be included in one media area, for example, the media area of the first track area. Alternately, the media areas can have the timing information on the corresponding media data, respectively. In other words, the media area of the first track area can have the timing information on the first media data, and the media area of the second track area can have the timing information on the second media data, and the media area of the third track area can have the timing information on the third media data.

The track meta area can include information for distinguishing the media data from each other. In other words, the attribute information on the media data can be included in the meta area of the media information area, or included in the track meta area of the track area. In case where the information is included in the meta area, the information on all the media data included in the data area are desirably included in one meta area. In case where the information is included in the track meta area, the information on each media data is desirably divided and positioned in the track meta area included in the corresponding track area. Also, the track meta area can have information on the animation effect.

FIG. 3 illustrates a multimedia data structure according to a second exemplary embodiment of the present invention. A data area can include an image data area, an audio data area, and a text data area. A media information area can include a slide show area having information on image data, an audio track area having information on audio data, and a text track area having information on text data.

The image data included in the image data area can be still picture data or moving picture data. The image data can be data compressed in a format of Joint Picture Expert Group (JPEG), Moving Picture Expert Group (MPEG)-1, 2, or Advanced Video Coding (AVC). In other words, the image data can be data such as various formats of video clips or photographs acquired by a device (not shown) such as a camcorder (not shown) or a portable terminal (not shown).

The audio data included in the audio data area can be music data, accompaniment data, or voice data. The audio data can be data compressed in a format of MPEG Layer-3 (MP3) or Advanced Audio Coding (AAC). Alternately, the audio data can be a result obtained by synthesizing the accompaniment data and the voice data. The accompaniment data can be data expressed by only a musical instrument sound excluding a musician's voice in music.

The text data included in the text data area can be data having a character string distinguished in a line unit. In this case, each line can be treated as a sample.

Figure 5:
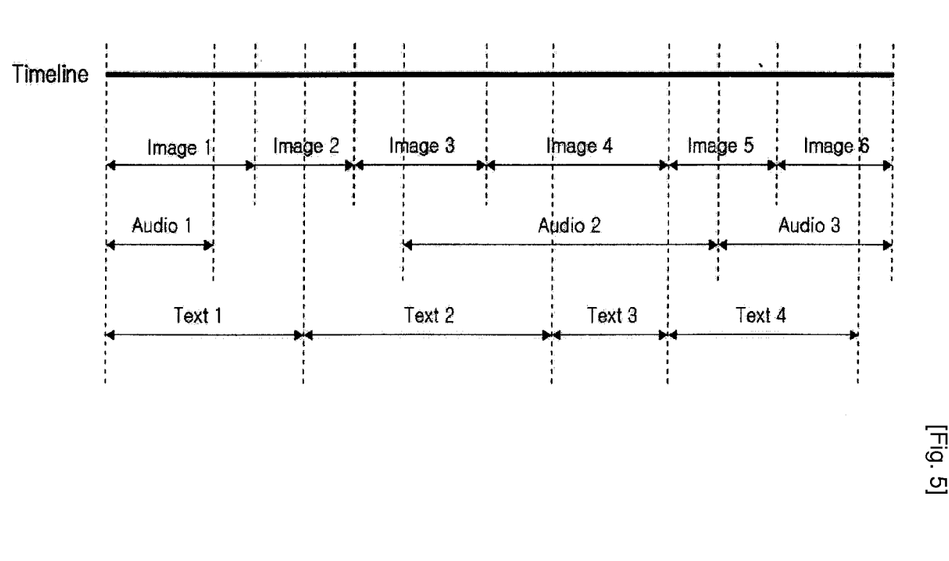
FIG. 5 illustrates timing information on a plurality of media data according to an exemplary embodiment of the present invention.

FIG. 5 illustrates timing information on a plurality of media data according to an exemplary embodiment of the present invention. An image data area has six pieces of image data, and an audio data area has three pieces of audio data, and a text data area has four pieces of text data.

As shown in FIG. 5, the media data are dependent on one timeline, but have timing information separately. Therefore, reproduction durations may not be consistent with each other. It is desirable that each of the media data included in the media data area has reproduction duration information, position information, and size information.

A media area of a slide show area can have all of the reproduction duration information, the position information, and the size information on the six pieces of image data, the three pieces of audio data, and the four pieces of text data. In another exemplary embodiment, a media area of a slide show area has reproduction duration information, position information, and size information on six pieces of image data. A media area of an audio track area has reproduction duration information, position information, and size information on three pieces of audio data. A media area of a text track area can have reproduction duration information, position information, and size information on four pieces of text data.

Figure 6:
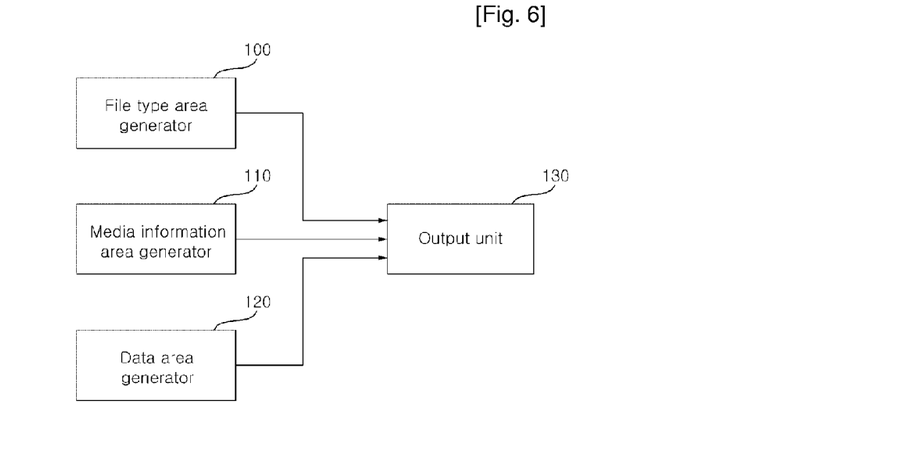
FIG. 6 is a block diagram illustrating a construction of an encoding apparatus according to an exemplary embodiment of the present invention.

FIG. 6 is a block diagram illustrating a construction of an encoding apparatus according to an exemplary embodiment of the present invention. The encoding apparatus includes a file type area generator 100, a media information area generator 110, a data area generator 120, and an output unit 130.

Figure 8:
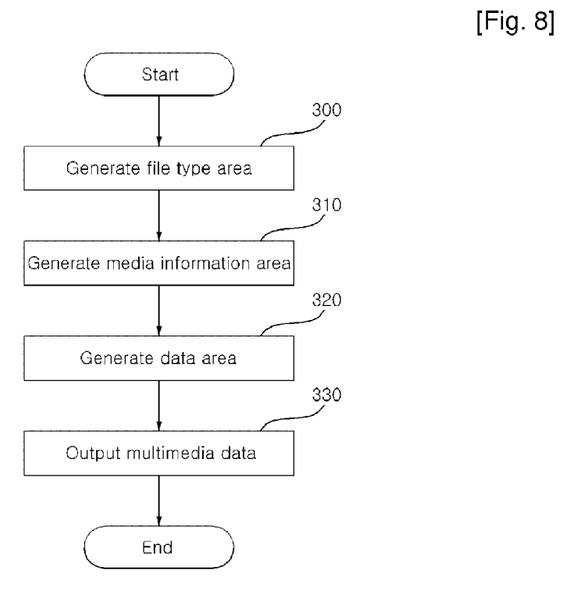
FIG. 8 is a flowchart illustrating an encoding method according to the present invention.

Also with reference to FIG. 8, the file type area generator 100 generates a file type area representing a format of a multimedia data file (Step 300). The media information area generator 110 generates a media information area including information on media data, for example, timing information on the media data included in a data area (Step 310). The data area generator 120 generates a data area including a plurality of media data areas (Step 320).

A sequence of generating the area in the encoding apparatus shown in FIG. 6 is merely one example of an operation of the encoding apparatus according to the present invention. Thus, it is not intended to limit the scope of the present invention. The area generation sequence can be modified, or two or more areas can be simultaneously generated in parallel.

The output unit 130 constructs the generated file type area, media information area, and data area as one file, and outputs the encoded multimedia data (Step 330).

A description of the file type area, the media information area, and the data area is the same as the above description and thus, will be omitted.

Figure 7:
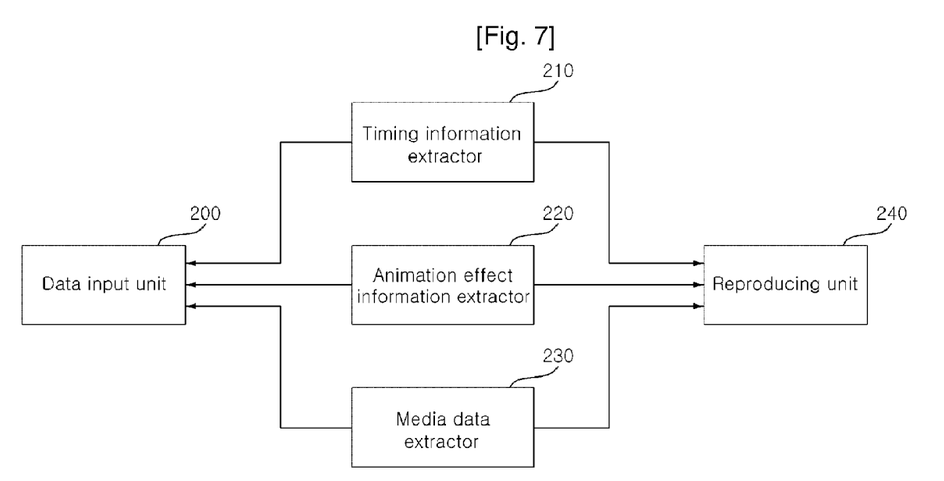
FIG. 7 is a block diagram illustrating a construction of a decoding apparatus according to an exemplary embodiment of the present invention.
Figure 9:
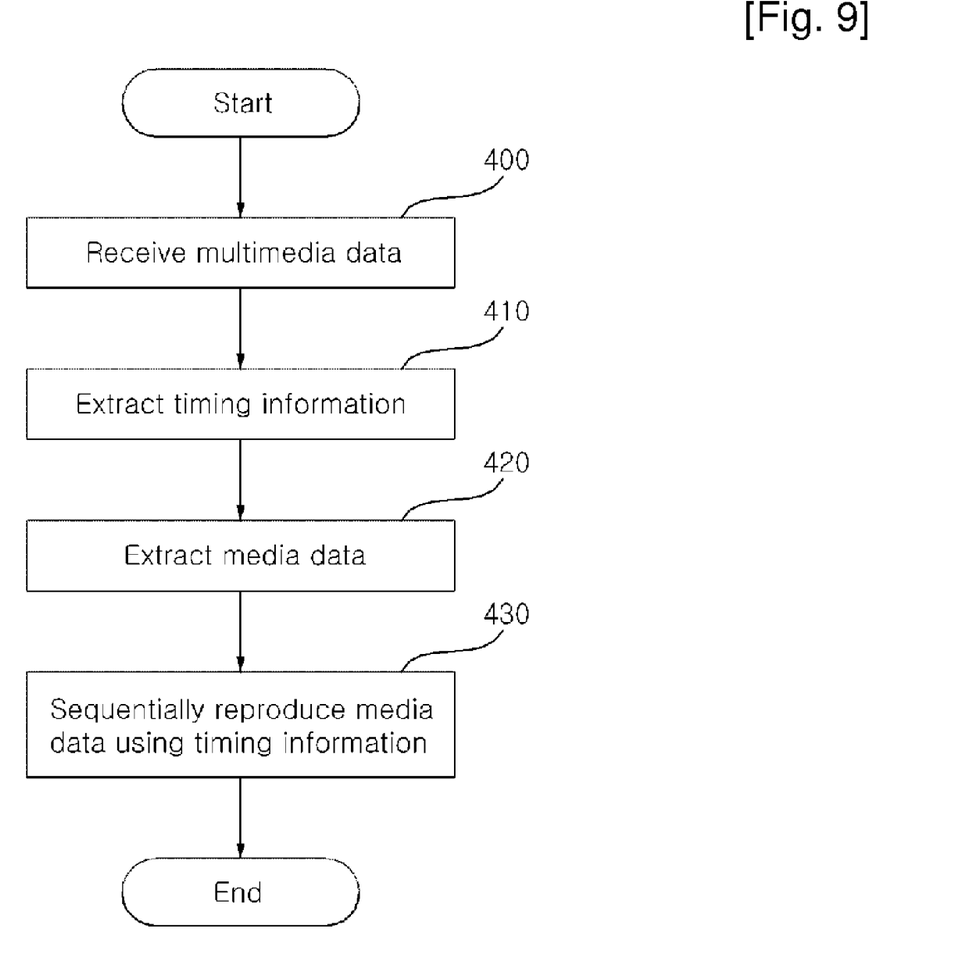
FIG. 9 is a flowchart illustrating a decoding method according to the present invention.

FIG. 7 is a block diagram illustrating a construction of a decoding apparatus according to an exemplary embodiment of the present invention. The decoding apparatus includes a data input unit 200, a timing information extractor 210, an animation effect information extractor 220, a media data extractor 230, and a reproducing unit 240. An operation of the decoding apparatus shown in FIG. 7 will be described with reference to FIG. 9. FIG. 9 is a flowchart illustrating a decoding method according to an exemplary embodiment of the present invention.

The data input unit 200 receives multimedia data (Step 400). The timing information extractor 210 extracts timing information on media data from the received multimedia data (Step 410). It is desirable that the timing information extractor 210 parses a media information area from the received multimedia data and then, extracts the timing information on the media data from a media area included in the media information area.

The media data extractor 230 extracts the media data to be reproduced depending on the extracted timing information from a data area (Step 420). It is desirable that the media data extractor 230 searches the data area for the media data, using size information and position information on the media data included in the media area.

The reproducing unit 240 sequentially reproduces the extracted media data using the extracted timing information, thereby constructing a slide show (Step 430).

In case where there exists animation effect information in an animation area, the animation effect information extractor 220 parses the animation area, and extracts the animation effect information. The reproducing unit 240 can reproduce image data included in an image data area, using the animation effect information. In addition, the reproducing unit 240 reproduce audio data and text data, using the timing information extracted by the timing information extractor 210.

The encoding/decoding method according to the present invention can be programmed for execution in a computer and stored in a computer readable recording medium. The multimedia data having the data structure according to the present invention can be also stored in the computer readable recording medium. The computer readable recording medium includes all kinds of storage units storing data readable by a computer system. The computer readable recording medium is exemplified as a Read Only Memory (ROM), a Random Access Memory (RAM), a Compact-Disk Read Only Memory (CD-ROM), a magnetic tape, a floppy disk, and an optic data storage unit, and includes a unit realized in a format of carrier wave (e.g., Internet transmission). The computer readable recording medium is dispersed to the computer system connecting thereto through a network, and can store and execute a computer readable code in a dispersion method. Function program, code and code segments for realizing a user tracking method can be easily inferred by programmers in a technological field of the present invention.

As described above, an encoding/decoding method and apparatus according to the present invention can be widely used for a multimedia player or a multimedia coding device for reproducing a plurality of media data, thereby reducing a time taken to process and transmit the multimedia data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A decoding method, implemented by a processor, comprising:
receiving multimedia data, the multimedia data including a file type area having information on a file format, a data area comprising a plurality of media data, and a media information area comprising a slide show area and an audio track area corresponding to image data and audio data in the data area, respectively, the slide show area including a media area and a track meta area, the media area of the slide show area including reproduction duration information, position information, and size information on a plurality of image data, each reproduction duration information, position information, and size information in the media area of the slide show area being allocated for each image data;
parsing the multimedia data, the media information area of the multimedia data being parsed first;
extracting timing information related to the reproduction duration information from the media area of the slide show area of the media information area; and
reproducing the image data and the audio data in the data area, based on the extracted timing information, wherein the image data and the audio data in the data area are dependent on one timeline,
each track meta area of the slide show area and the audio track area includes meta information on the image data and the audio data, respectively, and
each track meta area of the slide show area and the audio track area includes XML format data on the meta information.

2. The decoding method of claim 1, wherein the multimedia data further comprises a meta area and wherein the meta area comprises name and content type information on the plurality of media data.

3. The decoding method of claim 1, wherein the multimedia data further comprises a meta area and wherein the meta area comprises identifications (IDs), position information, and size information on the plurality of media data.

4. The decoding method of claim 1, wherein the slide show area comprises all the timing information on the plurality of media data.

5. The decoding method of claim 1, wherein there exists the timing information on each of the plurality of media data.

6. The decoding method of claim 1, wherein the meta information includes information for distinguishing the media data from each other.

7. The decoding method of claim 1, wherein the track meta area of the slide show area includes information on an animation effect.

8. A decoding apparatus comprising:
a processor coupled to a memory;
a data input unit for receiving multimedia data, via the processor, the multimedia data including a file type area having information on a file format, a data area comprising a plurality of media data, and a media information area comprising a slide show area and an audio track area corresponding to image data and audio data in the data area, respectively, the slide show area including a media area and a track meta area, the media area of the slide show area including reproduction duration information, position information, and size information on a plurality of image data, each reproduction duration information, position information, and size information in the media area of the slide show area being allocated for each image data;
a timing information extractor for parsing the media information area from the received multimedia data and for extracting timing information related to the reproduction duration information from the media area of the slide show area of the media information area; and
a reproducing unit for reproducing the image data and the audio data in the data area, based on the extracted timing information, wherein the image data and the audio data in the data area are dependent on one timeline,
each track meta area of the slide show area and the audio track area includes meta information on the image data and the audio data, respectively, and
each track meta area of the slide show area and the audio track area includes XML format data on the meta information.

9. The decoding apparatus of claim 8, wherein the meta information includes information for distinguishing the media data from each other.

10. The decoding apparatus of claim 8, wherein the track meta area of the slide show area includes information on an animation effect.

* * * * *